Jan. 27, 1931.  E. G. McCAULEY  1,790,163
PROPELLER FOR AIRCRAFT
Filed Oct. 9, 1923
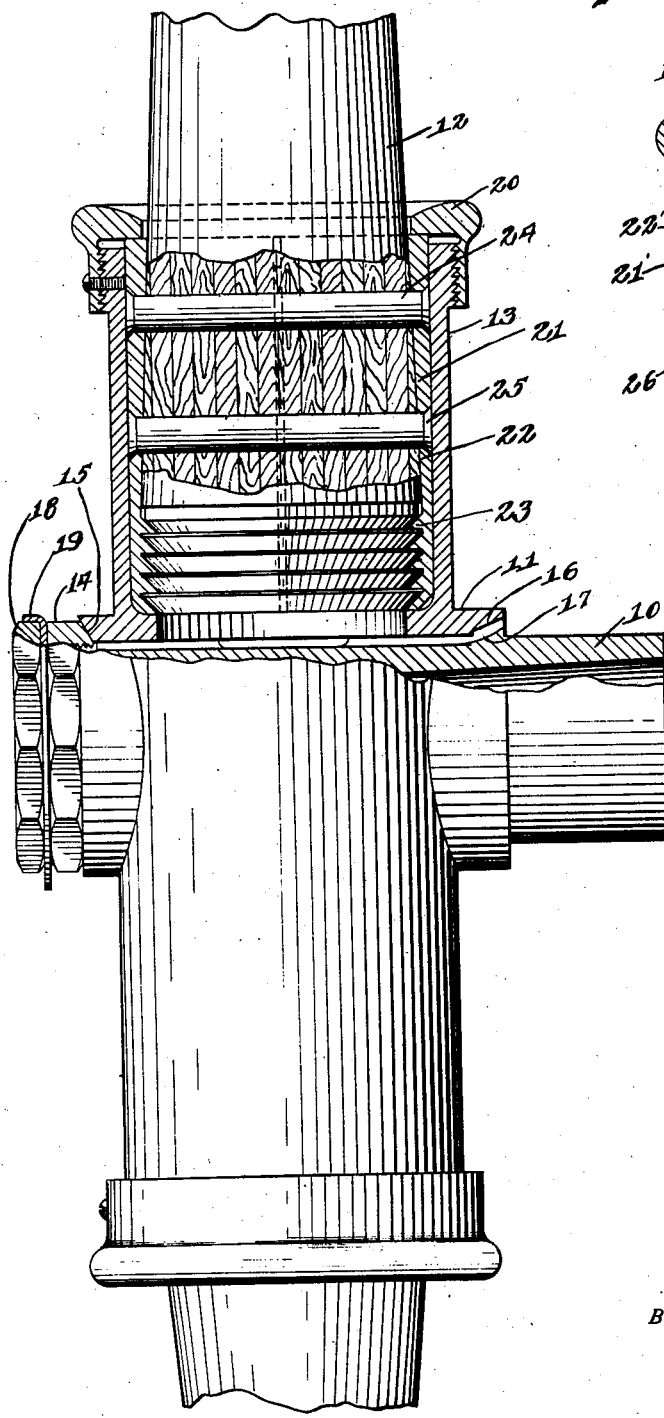
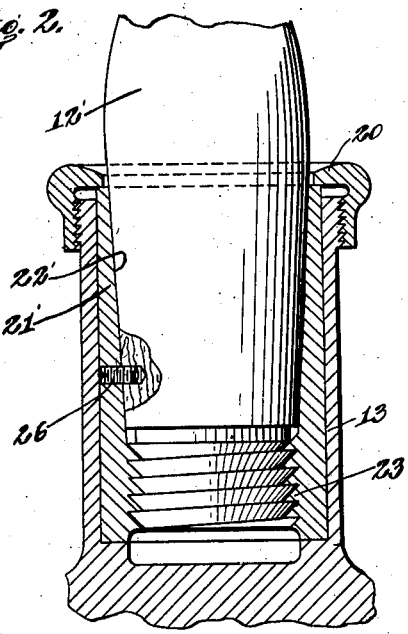
INVENTOR
Ernest G. M'Cauley
BY
ATTORNEY Patented Jan. 27, 1931

1,790,163

UNITED STATES PATENT OFFICE

ERNEST G. McCAULEY, OF DAYTON, OHIO, ASSIGNOR TO THE HAMILTON STANDARD PROPELLER CORPORATION, A CORPORATION OF PENNSYLVANIA

PROPELLER FOR AIRCRAFT

Application filed October 9, 1923. Serial No. 667,521.

This invention relates to propellers for aircraft generally, and has for its principal object to provide means for retaining the blades to withstand the great centrifugal forces to which they are subject in operation whereby to eliminate all perceptible looseness of the blades within the hub and form a rigid structure.

Other objects of the invention having to do with structural details will be brought out in the course of the following description.

In the drawing, Fig. 1 is a view partly in section and partly in elevation of the hub portion of the propeller in which is embodied the improvements of the present invention. Fig. 2 is a fragmentary detail of a blade mounting of an alternative form. In the two views the same or similar reference numerals are applied to corresponding parts.

The propeller is carried on a sleeve 10 fitting over and keyed upon the tapered outer end of the engine crank shaft. The propeller hub 11 carries blades 12 in the diametrically opposed socket members 13 provided therein. The hub 11 is centered on said sleeve at one end by a nut 14 threaded on the sleeve 10. The nut has a tapered end to co-act with the taper counterbore in the end of the hub 11. The nut 14 forces the hub 11 endwise of the sleeve 10 so that the taper counterbore 16 at the inner end of the hub wedgingly engages the seat 17 on the sleeve. To insure against the hub loosening, a lock nut 18 and a lock washer 19 are provided on the sleeve 10 alongside the nut 14.

The propeller blades 12 are held in the socket members 13 by gland nuts 20 threading on the socket members and engaging the outer ends of ferrules 21 on the inner ends of the blades 12. The ferrules have outwardly tapered bores as indicated at 22 to fit the tapered inner ends of the blades 12 and have also a series of ridges and grooves 23 of a buttress form to inter-fit with ridges and grooves on the extreme inner end of the propeller blades so that when the ferrules are held in the socket members 13 the blades are rigidly secured therein against endwise movement each ridge on both the blade and ferrule forming a shoulder and an abutment respectively. The gland nuts 20 are drawn up to prevent turning or endwise movement of the ferrules and thereby also of the blades fixed therein. However, despite the fact that the blades when first assembled may be tight and rigid the terrific centrifugal action to which the blades are subject in operation produces compression in the fibres of micarta and wooden blades or causes a taking up of micrometric clearances in the case of adjustable metallic blades to such an extent that they are soon wobbly. In the present construction, the drawing out of the blade by centrifugal force, resulting in a compression of the fibres about the shank generally and about the pins hereinafter referred to, causes the blade shank to wedge in the tapered bores of the ferrules. The ferrules being rigidly held there is no resulting looseness of the blades, but the blades become tighter the longer they are used. It will be appreciated that various other arrangements for securing the same result will at once appear to those skilled in this art, after an understanding of the arrangement herein shown. For example, the buttress ridges and grooves in the structure shown may be changed to threads and the same may be provided in the hub wall proper instead of in the ferrule, the latter being used simply as a wedging means as in the present case. Various other similar changes are likewise considered apparent and within the scope of the present invention.

The ferrules 21 are divided on a longitudinal median plane into half sections to permit assembling the same on the ends of the propeller blades. Dowel pins 24 may be provided joining the halves of the ferrules 21 and extending through the inner ends of the propeller blades 12. These pins are riveted at their outer ends as indicated at 25 to hold the halves of the ferrules together and also to secure the ferrules permanently in assembled relation upon the inner ends of the propeller blades. The pins 24 are not absolutely necessary and may be dispensed with since the blades are otherwise securely held simply by the ferrule sections assembled on the ends of the blades and fitted in the socket member and secured by the gland nuts. It is apparent that the blades are susceptible of angular adjustment for pitch setting when the gland nuts 20 are loosened and that when the latter are subsequently tightened, the blades are thereby rigidly secured in adjusted position.

In Fig. 2 is shown an alternative form of my invention in which a one-piece ferrule 21' is held in the socket member 13 by a gland nut 20 to hold the blade 12' in position. The ferrule 21' has a tapering bore 22' to receive the tapering end of the blade 12' and also has internal buttress threads 23' in which the inner extremity of the blade 12' is threaded. A screw 26 is threaded in the wall of the ferrule 21' and arranged to secure the blade when the same has been threaded tight in the ferrule. The blade wedges in the ferrule when its inner end is threaded in the ferrule 21' and as a result a very rigid structure is provided when the gland nut is drawn up against the ferrule.

I claim:

1. In a propeller, a hub having a socket member, a blade, said blade having a tapering end portion to enter said socket member and having a ferrule thereon, an abutment member to engage said ferrule to hold the blade in said socket member, and means secured on said hub engaging said abutment member, movement of said blade outwardly relative to said last-mentioned means serving to increase the wedging action of said blade in said socket member.

2. The combination of a hub, an integral blade socket member attached to the hub, the outer portion of the hub being threaded, a gland nut adapted to engage said threads, a propeller blade, a ferrule threaded onto the blade shank and adapted to fit into said socket member, the gland nut having an inturned flange adapted to engage the outer portion of the ferrule, and thereby to clamp the blade in the socket member.

In testimony whereof I affix my signature.

ERNEST G. McCAULEY.